United States Patent [19]
Abe et al.

[11] Patent Number: 5,125,053
[45] Date of Patent: Jun. 23, 1992

[54] OPTICAL COUPLER ULTIZING PRISMS

[75] Inventors: Kenichi Abe; Norihisa Naganuma; Hisashi Takamatsu, all of Kanagawa, Japan

[73] Assignee: Fujitsu Limited, Kanagawa, Japan

[21] Appl. No.: 662,736

[22] Filed: Mar. 1, 1991

[30] Foreign Application Priority Data

| Mar. 2, 1990 [JP] | Japan | 2-049254 |
| Sep. 19, 1990 [JP] | Japan | 2-247219 |
| Sep. 20, 1990 [JP] | Japan | 2-248672 |

[51] Int. Cl.$^5$ .................................................. G02B 6/34
[52] U.S. Cl. .................................................. 385/36; 385/33
[58] Field of Search ............... 350/96.19, 96.15, 96.18; 385/31, 33, 36, 37

[56] References Cited

U.S. PATENT DOCUMENTS 4,152,045  5/1979  Hammer et al. ................ 350/96.19
4,252,404  2/1981  Divita ...................... 350/96.19 X

FOREIGN PATENT DOCUMENTS 0137302  10/1981  Japan ..................... 350/96.19

Primary Examiner—John D. Lee
Assistant Examiner—Phan T. Heartney
Attorney, Agent, or Firm—Kelfgott & Karas

[57] ABSTRACT

An optical coupler is disclosed which couples a signal beam and a pumping beam having proximate wavelengths to each other. The optical coupler includes a first prism having an included angle of 45 degrees, and a triangular prism having an apex angle of 22.5 degrees and adhered to a face of the first prism on which an optical wavelength multiplexing film is formed. The signal beam and the pumping beam multiplexed by the optical coupled is introduced into an Er doped fiber, in which the signal beam is amplified directly.

14 Claims, 8 Drawing Sheets

OPTICAL COUPLER UTLIZING PRISMS

BACKGROUND OF THE INVENTION

This invention relates generally to an optical coupler for coupling a first beam and a second beam having different wavelengths to each other, and more particularly to an optical coupler suitably used to couple a signal beam and a pumping beam having proximate wavelengths to each other and introduce the beam obtained by such coupling into an Er doped fiber.

In an optical fiber communication system which has been put into practical use, a repeater is interposed at each predetermined distance in order to compensate for attenuation of an optical signal caused by loss in an optical fiber. Such repeater is constituted such that an optical signal is converted into an electric signal by a photodiode, and the electric signal is amplified by an electronic amplifier and is then converted back into an optical signal by a semiconductor laser or the like, whereafter the optical signal is sent out into an optical fiber transmission line. If such optical signal can be amplified in low noises while it remains in the form of an optical signal, then the repeater can be reduced in size and economized.

Thus, investigation of optical amplifiers which can directly amplify an optical signal is being proceeded extensively. Optical amplifiers which are made objects of investigation are divided roughly into three types including (a) a first type which includes a combination of an optical fiber doped with a rare earth element (Er, Nd, Yb and so forth) and a pumping beam, (b) a second type which includes a semiconductor laser doped with a rare earth element, and (c) a third type which makes use of a non-linear effect in an optical fiber such as an induced Raman amplifier or an induced Brillouin amplifier.

An optical amplifier of the first type (a) which includes a combination of an optical fiber doped with a rare earth element and a pumping beam among the three types listed above has superior features that it has no polarization dependency, that it produces a comparatively small amount of noises and that the coupling loss is low. Therefore, it is anticipated that an optical fiber of the type (a) enables an increase of the repeater to repeater distance in an optical fiber transmission system and further enables distribution of optical signals to a large number of stations.

An Er doped optical fiber which is doped with Er as a rare earth element is commonly used for the amplification of the 1.55 μm band which is used in optical fiber communications.

FIG. 1 illustrates a principle of optical amplification by a rare earth element doped optical fiber. Reference numeral 2 denotes an optical fiber constituted from a core 4 and a clad 6, and Er (erbium) is doped in the core 4. If a pumping beam of a wavelength of, for example, 1.48 μm is introduced into such Er doped optical fiber 2, then Er atoms are excited to a higher energy level by the pumping beam. If a signal beam of another wavelength of, for example, 1.55 μm is introduced to such Er atoms in the optical fiber 2 which are excited to a higher energy level in this manner, the Er atoms drop to a lower energy level, whereupon stimulated emission of light takes place so that the power of the signal beam is increased gradually along the optical fiber, thereby effecting amplification of the signal beam.

FIG. 2 shows general construction of a conventional Er doped optical fiber amplifier based on the principle of amplification described just above. Reference numeral 10 denotes a polarized beams coupler, and a first pumping beam having a horizontal polarization plane and a second pumping beam having a vertical polarization plane are introduced into the polarized beams coupler 10 by way of a pair of optical fibers 11 and 12, respectively. The first and second pumping beams are combined with each other by and emitted from the polarized beams coupler 10. The first and second pumping beams have, for example, an equal wavelength of 1.48 μm. The polarized beams coupler 10 includes a polarized beams coupling prism unit 16 of a construction wherein a polarized beams coupling film 15 is sandwiched between a pair of triangular prisms 13 and 14.

The first pumping beam introduced in from the optical fiber 11 and having a horizontal polarization plane is collimated by a collimator lens 17 and then is introduced into the polarized beams coupling prism unit 16, in which it passes through the polarized beams coupling film 15 as it is. On the other hand, the second pumping beam introduced in from the optical fiber 12 and having a vertical polarization plane is collimated by another collimator lens 18 and is then introduced into the polarized beams coupling prism unit 16, in which it is reflected into the same light path as the transmitted light path of the first pumping beam by the polarized beams coupling film 15. Accordingly, the emergent beam from the polarized beams coupling prism unit 16 is a combination of the first pumping beam and the second pumping beam, and the pumping beams obtained by such coupling is condensed by a lens 19 and introduced into an optical fiber 20. Another optical fiber 21 is connected to the optical fiber 20 by way of a connecting adapter 22, and the first and second pumping beams transmitted by way of the optical fibers 20 and 21 are introduced into an optical wavelength multiplexer 23, in which they are wavelength multiplexed with a signal beam of, for example, the 1.55 μm band transmitted thereto along an optical fiber 28.

The optical wavelength multiplexer 23 includes an optical wavelength multiplexing prism 26 which in turn includes a triangular prism 24 and an optical wavelength multiplexing film 25 in the form of a dielectric multi-layer film or the like formed on an inclined face of the triangular prism 24. The first and second pumping beams from the optical fiber 21 are collimated by a collimator lens 27 and are then introduced into the optical wavelength multiplexing prism 26, in which they are transmitted through the optical multiplexing film 25, whereafter they are emitted from the optical wavelength multiplexing prism 26. On the other hand, the signal beam of the wavelength of, for example, 1.55 μm which has been transmitted along the optical fiber 28 is collimated by a collimator lens 29 and is then introduced into the optical wavelength multiplexing prism 26, in which it is reflected by the optical wavelength multiplexing film 25. Consequently, the signal beam is emitted into the same light pass as the transmitted light path of the pumping beams. The signal beam and the pumping beams wavelength multiplexed in this manner are condensed by a lens 30 and introduced into an Er doped optical fiber 31 in which amplification of the signal beam takes place based on the principle described hereinabove.

The reason why a first pumping beam and a second pumping beam are coupled to each other by the polarized beams coupler 10 in the construction of the conventional Er doped optical fiber amplifier is that, when the output power of a semiconductor laser (LD) which emits a pumping beam is not sufficiently high, two semiconductor lasers are used in order to assure a pumping beam of a high output power. In case the output powers of the semiconductor lasers are sufficiently high, only one of two pumping beams can be used, thereby employing a redundant structure.

In the Er doped optical fiber amplifier, a laser beam of the wavelength of 1.55 μm band and another laser beam of the wavelength of 1.48 μm are employed as a signal beam and a pumping beam, respectively, as described hereinabove. Where the difference in wavelength between a signal beam and a pumping beam is small in this manner, if the angle of incidence of the signal beam to an optical wavelength multiplexing film is not smaller than 45 degrees, wavelength multiplexing of the signal beam and the pumping beam cannot be achieved sufficiently. Accordingly, there is a problem that such signal beam cannot be introduced into an optical wavelength multiplexing prism perpendicularly or parallelly to the light path of the pumping beam, and accordingly, the arrangement of optical parts including an optical wavelength multiplexing prism becomes complicated.

SUMMARY OF THE INVENTION

Accordingly, it is an object of the present invention to provide an optical coupler into which a signal beam and a pumping beam having a small difference in wavelength can be introduced perpendicularly or parallelly to each other.

It is another object of the present invention to provide an optical coupler wherein a signal beam and a pumping beam having a small difference in wavelength can be coupled to each other and introduced into an optical fiber amplifier.

In accordance with an aspect of the present invention, there is provided an optical coupler for coupling a first beam and a second beam having different wavelengths to each other, which comprises a first prism having an included angle of 45 degrees and having a total reflection film formed on a first one of a pair of faces thereof which define the included angle while an optical wavelength multiplexing film is formed on the second one of the faces of the first prism defining the included angle, and a second prism adhered to the second face of the first prism on which the optical wavelength multiplexing film is formed, the second prism having an apex angle sufficient to allow a wavelength multiplexing of the first beam and the second beam.

Preferably, the second prism is a triangular prism having an apex angle of 22.5 degrees. Alternatively, the second prism may be a quadrangular prism having opposing apex angles of 22.5 degrees and 45 degrees.

Preferably, the first beam is a signal beam, and the second beam is a pumping beam. The signal beam is first totally reflected by the total reflection film and then introduced to the optical wavelength multiplexing film, at which it is coupled to the pumping beam. The thus coupled signal beam and pumping beam are introduced into an Er doped optical fiber, in which the signal beam is amplified.

In accordance with another aspect of the present invention, there is provided an optical coupler for coupling a first beam and a second beam having different wavelengths to each other, which comprises a first prism having an included angle of 45 degrees and having a total reflection film formed on a first one of a pair of faces thereof which define the included angle while an optical wavelength multiplexing film is formed on the second one of the faces of the first prism defining the included angle, a quadrangular prism having a first included angle sufficient to allow a wavelength multiplexing of the first beam and the second beam and a second included angle of 45 degrees opposing to the first included angle, the quadrangular prism being adhered to the second face of the first prism on which the optical wavelength multiplexing film is formed such that the first included angle of the former is positioned adjacent the included angle of the first prism, the quadrangular prism having a polarized beams coupling film formed on a face thereof remote from the second face of the first prism on which the optical wavelength multiplexing film is formed, and a triangular prism adhered to the face of the quadrangular prism on which the polarized beams coupling film is formed.

In accordance with a further aspect of the present invention, there is provided an optical coupler for coupling a first beam and a second beam having different wavelengths to each other, which comprises a first prism having an included angle of 45 degrees and having a total reflection film formed on a first one of a pair of faces thereof which define the included angle while an optical wavelength multiplexing film is formed on the second one of the faces of the first prism defining the included angle, a triangular prism having a first included angle between a first inclined face and a bottom face sufficient to allow wavelength multiplexing of the first beam and the second beam and a second included angle of 45 degrees between a second inclined face and the bottom face, the triangular prism being adhered to the second face of the first prism on which the optical wavelength multiplexing film is formed such that the first included angle of the former is positioned adjacent the included angle of the first prism, the triangular prism having a polarized beams coupling film formed on the second face thereof, and a parallelogram prism adhered to the face of the triangular prism on which the polarized beams coupling film is formed.

The above and other objects, features and advantages of the present invention and the manner of realizing them will become more apparent, and the invention itself will best be understood, from a study of the following description and appended claims with reference had to the attached drawings showing some preferred embodiments of the invention.

DESCRIPTION OF THE PREFERRED EMBODIMENTS

Figure 1:
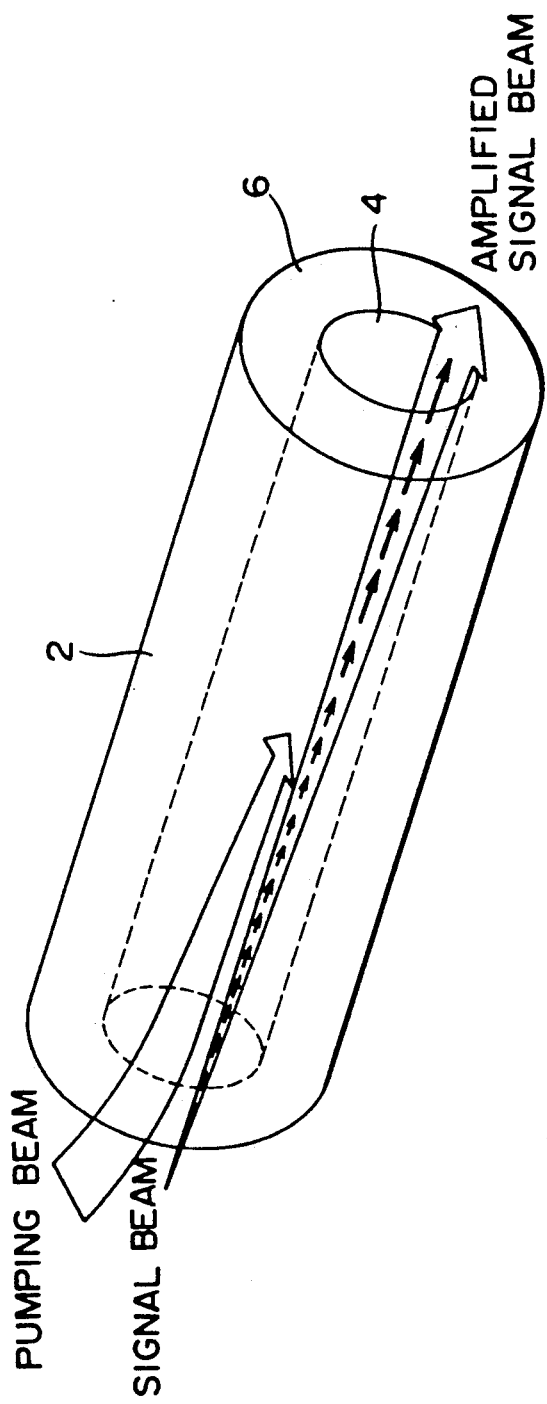
FIG. 1 is a schematic view illustrating a principle of optical amplification by an Er doped optical fiber.
Figure 2:
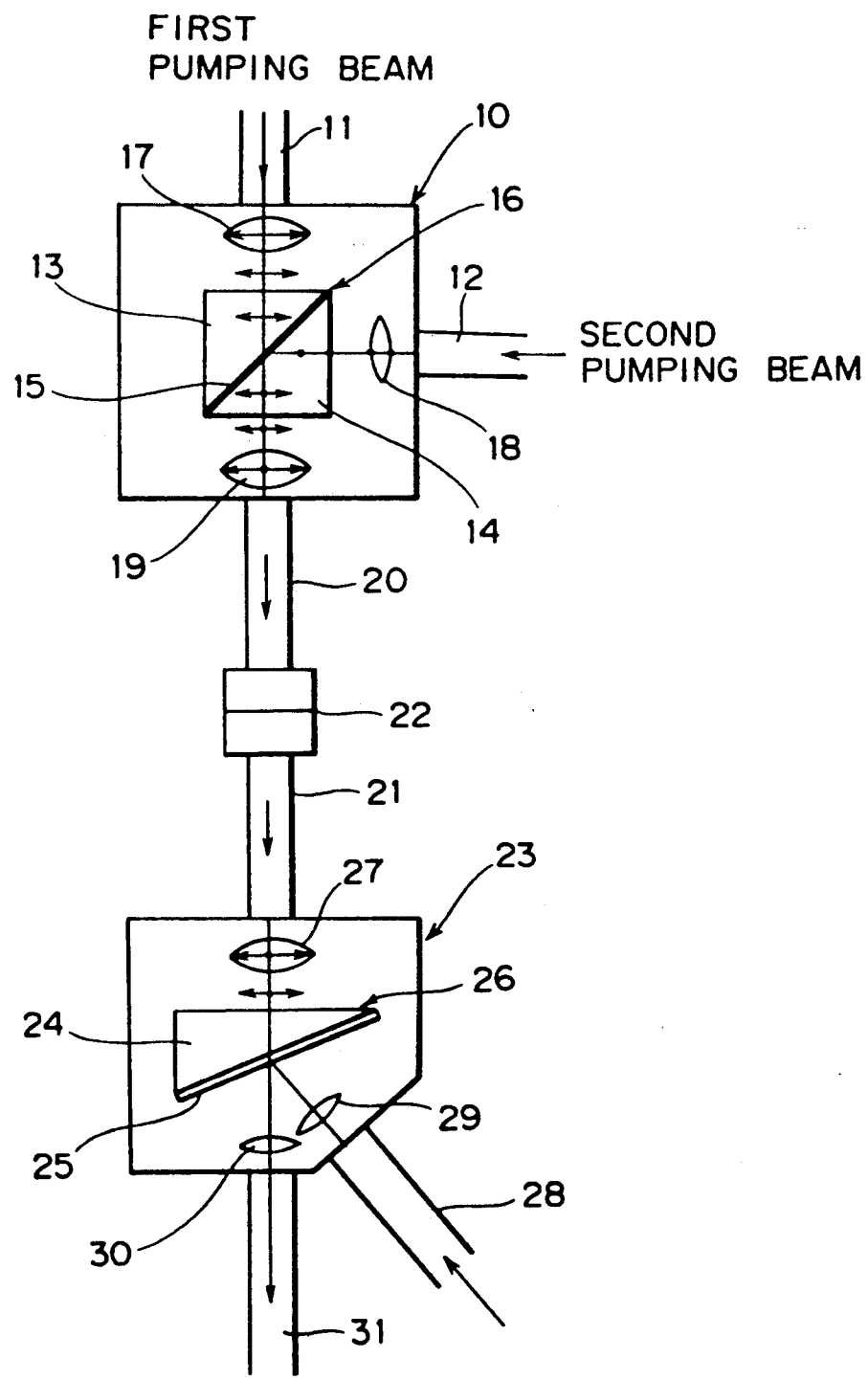
FIG. 2 is a diagrammatic representation of an exemplary conventional optical coupler.
Figure 3:
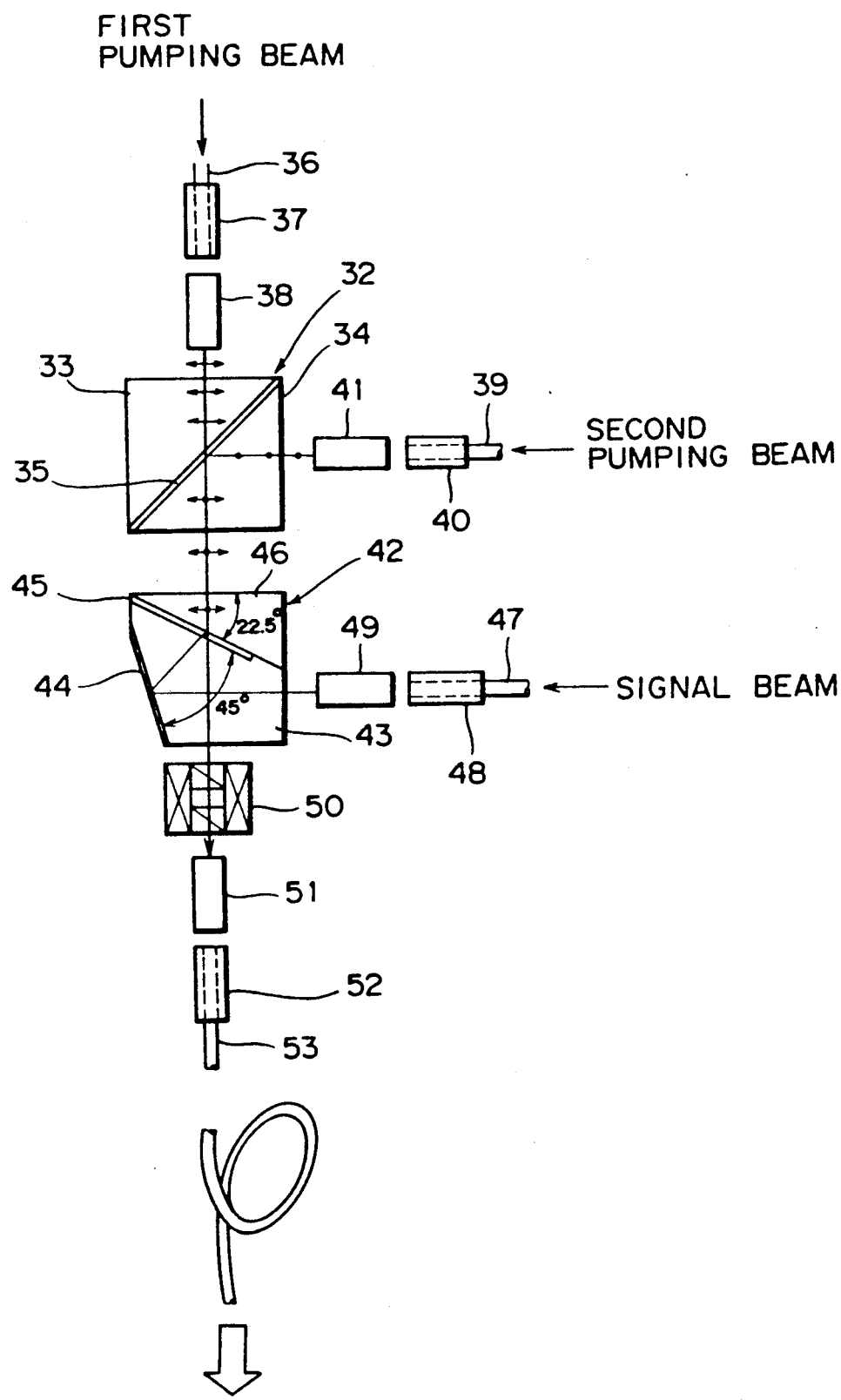
FIG. 3 is a diagrammatic representation of an optical coupler according to a first embodiment of the present invention.
Figure 4:
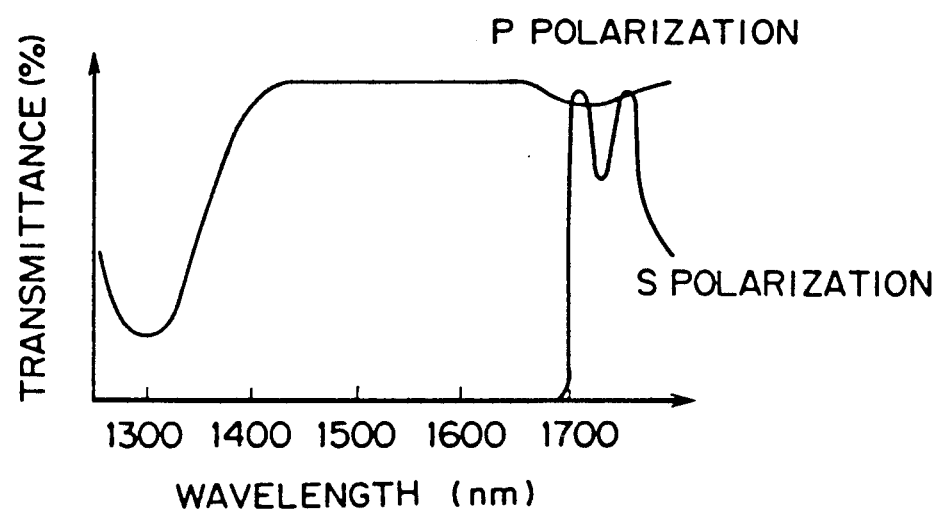
FIG. 4 is a diagram showing transmission characteristics of a polarized beams combining film.

FIG. 3 is a diagrammatic representation showing a first embodiment of the present invention. Reference numeral 32 denotes a polarized beams coupling prism unit, which is constituted from a pair of triangular prisms 33 and 34 and a polarized beams coupling film 35 in the form of a dielectric multi-layer film or the like formed by vapor deposition is provided between the triangular prisms 33 and 34. The polarized beams coupling film 35 has such transmission characteristics as shown in FIG. 4. In particular, the polarized beams coupling film 35 has characteristics that it transmits therethrough a first pumping beam of P polarization having a wavelength of 1.48 μm and having a horizontal polarization plane, but it reflects a second pumping beam of S polarization having a wavelength of 1.48 μm and having a vertical polarization plane.

The first pumping beam of the wavelength of 1.48 μm having a horizontal polarization is emitted from an optical fiber 36 inserted in a ferrule 37, collimated by a lens 38 and introduced into the polarized beams coupling prism unit 32, in which it is transmitted through the polarized beams coupling film 35. Consequently, the first pumping beam is emitted as it is from the polarized beams coupling prism unit 32. On the other hand, the second pumping beam of the wavelength of 1.48 μm having a vertical polarization plane is emitted from an optical fiber 39 inserted in a ferrule 40, collimated by a lens 41 and introduced into the polarized beams coupling prism unit 32, in which it is reflected by the polarized beams coupling film 35. Consequently, the second pumping beam is emitted into the same light path as the transmitted light path of the first pumping beam. As a result, the first pumping beam and the second pumping beam are coupled to each other.

The reason why the first pumping beam and the second pumping beam are coupled to each other by the polarized beams coupling prism unit 32 in this manner is that it is intended to couple, when the output power of a semiconductor laser which emits a pumping beam is not sufficiently high, two pumping beams to each other to raise the power of an output pumping beam. In case the output powers of the pumping beam sources are sufficiently high, only one of the two pumping beam sources can be driven to increase the redundancy of the pumping beam.

Figure 5:
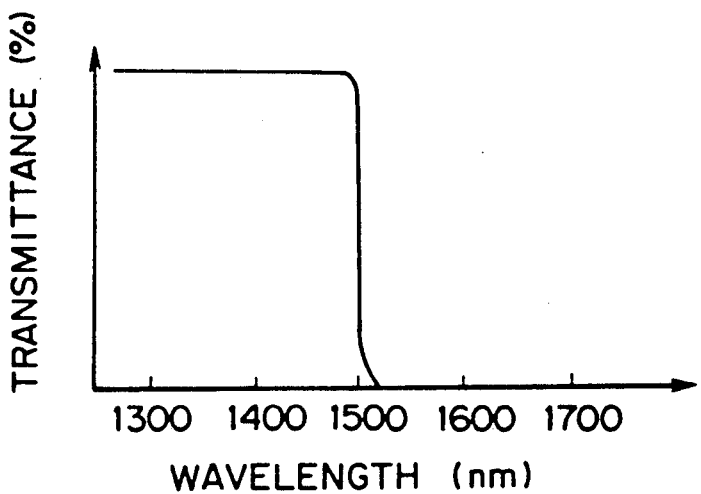
FIG. 5 is a diagram showing transmission characteristics of an optical wavelength multiplexing film.

Reference numeral 42 denotes an optical wavelength multiplexing prism unit for wavelength multiplexing a pumping beam and a signal beam, and the optical wavelength multiplexing prism unit 42 includes a prism 43 having an included angle of 45 degrees. A total reflection film 44 in the form of a dielectric multi-layer film or the like is formed on one of a pair of faces of the prism 43 which define the included angle while an optical wavelength multiplexing film 45 similarly in the form of a dielectric multi-layer film or the like is formed on the other one of the faces of the prism 43 defining the included angle. A triangular prism 46 having an apex angle of 22.5 degrees is adhered to the latter face of the prism 43. The transmission characteristics of the optical wavelength multiplexing film 45 are such as shown in FIG. 5 wherein the optical wavelength multiplexing film 45 transmits first and second pumping beams of the wavelength of 1.48 μm therethrough, but it reflects a signal beam of the wavelength of the 1.55 μm band.

First and second pumping beams emitted from the polarized beams coupling prism unit 32 are introduced into the optical wavelength multiplexing prism unit 42, in which they are transmitted through the optical wavelength multiplexing film 45. Consequently, they are emitted as they are from the optical wavelength multiplexing prism unit 42. On the other hand, a signal beam of the wavelength of the 1.55 μm band is emitted from an optical fiber 47 inserted in a ferrule 48 and is then collimated by a lens 49, whereafter it is introduced into the optical wavelength multiplexing prism unit 42. Then, the signal beam is totally reflected by the total reflection film 44 and is then introduced to the optical wavelength multiplexing film 45 at an angle of incidence smaller than 45 degrees. Consequently, the signal beam is reflected by the optical wavelength multiplexing film 45 and is then emitted into the same light path as the transmitted light path of the pumping beams. Consequently, the signal beam and the first and/or second pumping beams are wavelength multiplexed.

The signal beam and pumping beam wavelength multiplexed in this manner then pass through an optical isolator 50 and is then condensed by a lens 51, whereafter they are introduced into an Er doped optical fiber 53 inserted in a ferrule 52. While the signal beam and pumping beam propagate in the Er doped optical fiber 53, the signal beam is gradually amplified, and consequently, the amplified signal beam is sent out into a transmission line by way of an output port. Since the optical isolator 50 is interposed between the optical wavelength multiplexing prism unit 42 and the lens 51, reflected returning light which tries to return from the Er doped optical fiber 53 side to the optical wavelength multiplexing prism unit 42 is stopped by the optical isolator 50. As a result, such troubles are prevented that noises are produced by the optical fiber amplifier or optical amplification is made unstable by resonance.

In the present embodiment, since the prism 43 having the included angle of 45 degrees and the triangular prism 46 having the apex angle of 22.5 degrees are adhered to each other to constitute the optical wavelength multiplexing prism unit 42, when a signal beam and a pumping beam having a small difference in wavelength are to be coupled with each other, the signal beam can be totally reflected by the total reflection film 44 and introduced into the optical wavelength multiplexing film 45. Consequently, the incidence light path of a pumping beam and the incidence light path of a signal beam to the optical wavelength multiplexing prism unit 42 can be set such that they may make the right angles to each other.

Figure 6:
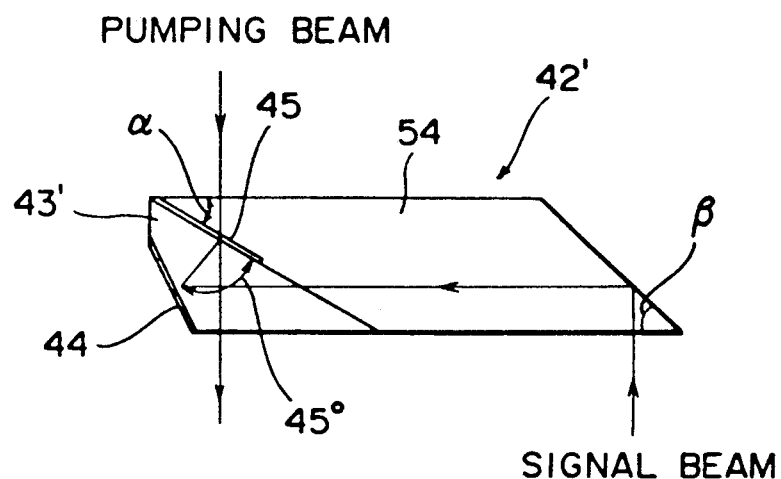
FIG. 6 is a diagrammatic representation of an optical coupler showing a second embodiment of the present invention.

FIG. 6 is a diagrammatic representation of an optical wavelength multiplexing prism unit showing a second embodiment of the present invention. The optical wavelength multiplexing prism unit 42′ in the present embodiment includes a prism 43′ having an included angle of 45 degrees similarly as in the case of the preceding embodiment, and a quadrangular prism 54 adhered to the prism 43' and having a pair of opposing apex angles of 22.5 degrees and 45 degrees. Since the optical wavelength multiplexing prism unit 42' of such construction is employed, a pumping beam and a signal beam can be introduced in parallel to each other into the optical wavelength multiplexing prism unit 42'.

Figure 7:
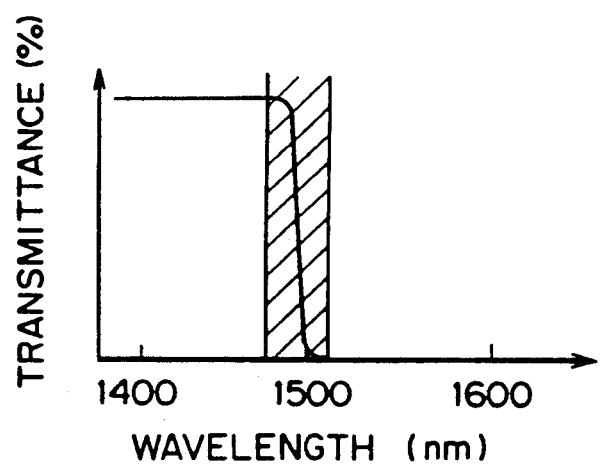
FIG. 7 is a diagram showing transmission characteristics of a low-pass filter.

While a first pumping beam and a second pumping beam are coupled to each other by the polarized beams coupling prism unit 32 in the two embodiments described hereinabove, otherwise where the pumping beams have different wavelengths, the polarized beams coupling prism unit 32 may be replaced by a prism unit with a low-pass filter film, a prism unit with a high-pass filter film or a prism unit with a band pass filter film. As an example, transmission characteristics of a low-pass filter film is shown in FIG. 7. If a pumping beam of a wavelength a little shorter than the wavelength of 1.48 μm is used as a first pumping beam, then the pumping beam is transmitted through the low-pass filter film, but if another pumping beam having a wavelength a little longer than the wavelength of 1.48 μm is used as a second pumping beam, then the pumping beam is reflected by the low-pass filter. In particular, the low-pass filter is used in such a band as indicated by hatching lines in FIG. 7.

Figure 8:
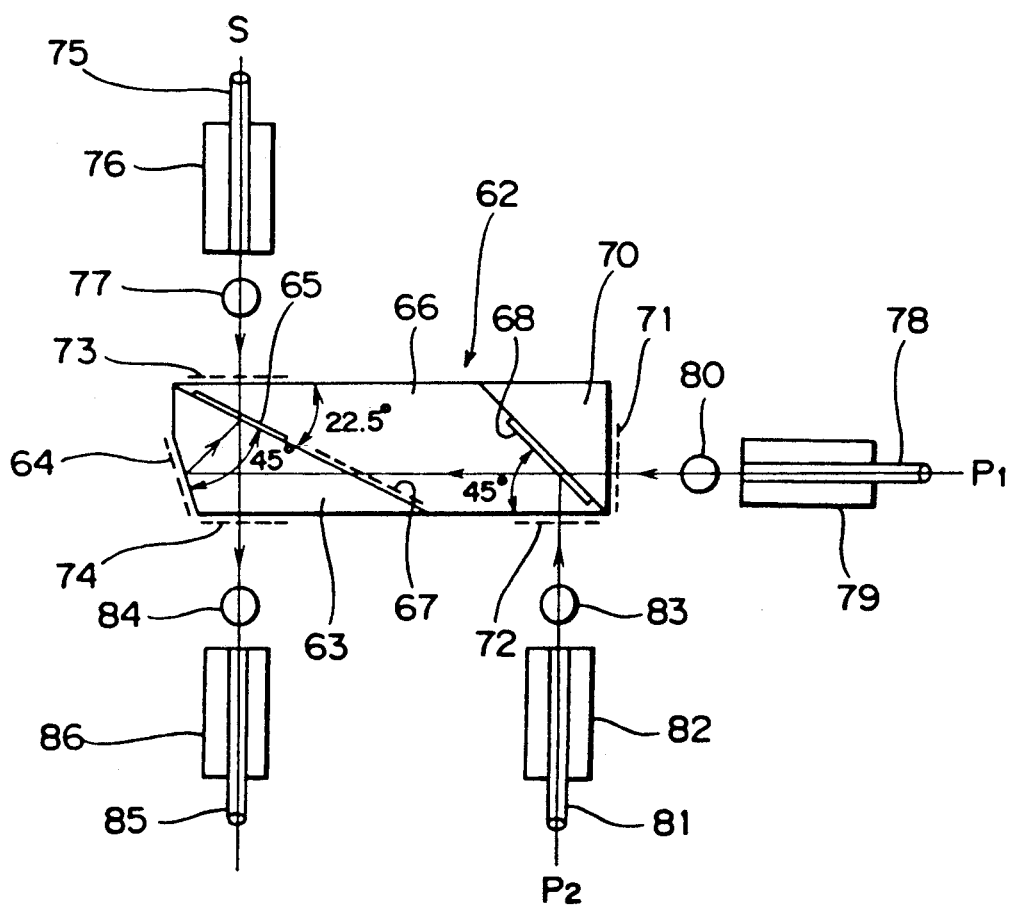
FIG. 8 is a diagrammatic representation of an optical coupler showing a third embodiment of the present invention.
Figure 9:
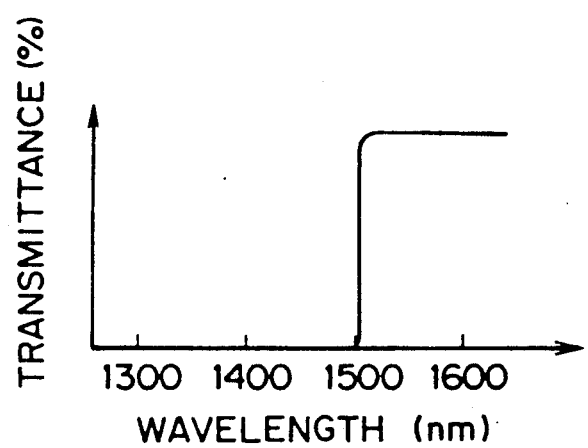
FIG. 9 is a diagram showing transmission characteristics of an optical wavelength multiplexing film employed in the optical coupler of FIG. 8.
Figure 10:
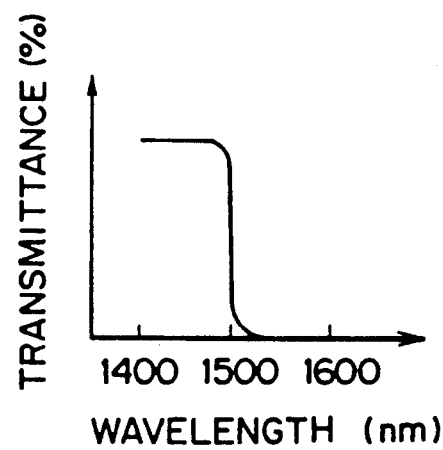
FIG. 10 is a diagram showing transmission characteristics of a filter film employed in the optical coupler of FIG. 8.

FIG. 8 is a diagrammatic representation of an optical wavelength multiplexing prism unit showing a third embodiment of the present invention. Reference numeral 62 denotes a prism unit wherein a polarized beams coupler and an optical wavelength multiplexer are integrated with each other. The prism unit 62 is constituted from a prism 63 having an included angle of 45 degrees, a quadrangular prism 66 and a rectangular equilateral triangular prism 70 adhered to each other. A total reflection film 64 in the form of a dielectric multi-layer film is formed on one of a pair of faces of the prism 63 which define the included angle of 45 degrees while an optical wavelength multiplexing film 65 similarly in the form of a dielectric multi-layer film is formed by means of vapor deposition or the like on the other one of the faces of the prism 63. The optical wavelength multiplexing film 65 has such transmission characteristics as shown in FIG. 9 wherein it transmits therethrough a signal beam of a wavelength of the 1.55 μm band but reflects first and second pumping beams of a wavelength of the 1.48 μm band. Further, a filter film 67 is provided on an interface between the prism 63 and the quadrangular prism 66 through which the pumping beams pass. The filter film 67 has such transmission characteristics as shown in FIG. 10 wherein it reflects a signal beam wavelength component but transmits the pumping beams therethrough.

The quadrangular prism 66 has a first included angle of 22.5 degrees and a second included angle of 45 degrees opposing to the first included angle and is adhered to the prism 63 such that the first included angle of 22.5 degrees thereof is positioned adjacent the included angle of 45 degrees of the latter. A polarized beams coupling film 68 in the form of a dielectric multi-layer film is formed by vapor deposition or the like on one of a pair of faces of the quadrangular prism 66 which define the second included angle of 45 degrees. The polarized beams coupling film 68 has such transmission characteristics as shown in FIG. 4. In particular, the polarized beams coupling film 68 has characteristics that it transmits therethrough a first pumping beam $P_1$ of P polarization having a wavelength of 1.48 μm and having a horizontal polarization plane, but it reflects a second pumping beam $P_2$ of S polarization having a wavelength of 1.48 μm and having a vertical polarization plane.

Further, the rectangular equilateral triangular prism 70 is adhered to the face of the quadrangular prism 66 on which the polarized beams coupling film 68 is formed. Then, filter films 71 and 72 are provided on one of the other faces of the triangular prism 70 and the other face of the quadrangular prism 66 defining the included angle of 45 degrees, respectively. The filter films 71 and 72 reflect a signal beam wavelength component but transmit a pumping beam therethrough, and accordingly have the same characteristics as the filter film 67. Reference numerals 73 and 74 denote each a reflection preventing film.

In operation, a signal beam of a wavelength of the 1.55 μm band is emitted from a single mode optical fiber 75 inserted in a ferrule 76 and is then collimated by a lens 77, whereafter it is introduced into the prism unit 62, in which it is transmitted through the optical wavelength multiplexing film 65. Then, the signal beam is emitted from the prism unit 62 and focused by a lens 84, whereafter it is introduced into an Er doped optical fiber 85 inserted in a ferrule 86.

On the other hand, a first pumping beam $P_1$ of the wavelength of 1.48 μm having a horizontal polarization plane is emitted from a polarization plane maintaining optical fiber 78 inserted in a ferrule 79 and is then collimated by a lens 80, whereafter a signal beam wavelength component is removed from the first pumping beam $P_1$ by the filter film 71. After then, the first pumping beam $P_1$ is introduced into the prism unit 62, in which it is transmitted through the polarized beams coupling film 68, whereafter it advances straightforwardly. A second pumping beam $P_2$ of the wavelength of 1.48 μm having a vertical polarization plane is emitted from a polarization plane maintaining optical fiber 81 inserted in a ferrule 82 and is then collimated by a lens 83, whereafter a signal beam wavelength component is removed from the second pumping beam $P_2$ by the filter film 72. After then, the second pumping beam $P_2$ is introduced into the prism unit 62, in which it is reflected by the polarized beams coupling film 68. Consequently, the second pumping beam $P_2$ is introduced into the same light path as the transmitted light path of the first pumping beam $P_1$, and accordingly, the first pumping beam $P_1$ and the second pumping beam $P_2$ are coupled to each other.

One of the reasons why the first pumping beam and the second pumping beam are coupled to each other by the polarized beams coupling film 68 in this manner is that it is intended to couple, when the output power of a semiconductor laser which emits a pumping beam is not sufficiently high, two pumping beams to each other to raise the power of an output pumping beam. In case the output powers of the pumping beam sources are sufficiently high, only one of the two pumping beam sources can be driven to increase the redundancy of the pumping beam.

The first and/or second pumping beams coupled to each other by the polarized beams coupling film 68 are transmitted through the filter film 67, whereupon a signal beam wavelength component is further attenuated. After then, the first and/or second pumping beams are totally reflected by the total reflection film 64 and then introduced to the optical wavelength multiplexing film 65 at an angle of incidence smaller than 45 degrees, for example, at an angle of incidence of 20 degrees or so. Then, the first and/or second pumping beams are reflected by the optical wavelength multiplexing film 65 and emitted into the same light path as the transmitted light path of the signal beam, and accordingly, the signal beam and the first and/or second pumping beams are wavelength multiplexed.

The signal beam and the first and/or second pumping beams wavelength multiplexed by the optical wavelength multiplexing film 65 in this manner are focused by a lens 84 and then introduced into an Er doped optical fiber 85 inserted in the ferrule 86. The signal beam is thus amplified in the Er doped optical fiber 85 in accordance with the principle described hereinabove and is then sent out into the transmisssion line.

In the present embodiment, since the prism 63 having the included angle of 45 degrees, the quadrangular prism 66 and the rectangular equilateral triangular prism 70 are adhered to each other to construct the prism unit 62 in which a polarized beams coupler and an optical wavelength multiplexer are integrated with each other, when a signal beam and a pumping beam having a small difference in wavelength are to be coupled with each other, the pumping beam can be totally reflected by the total reflection film 64 and introduced to the optical wavelength multiplexing film 65, and accordingly, the incidence light path of the pumping beam and the incidence light path of the signal beam to the prism unit 62 can be set such that they may make the right angle or have a parallel relationship to each other.

Figure 11:
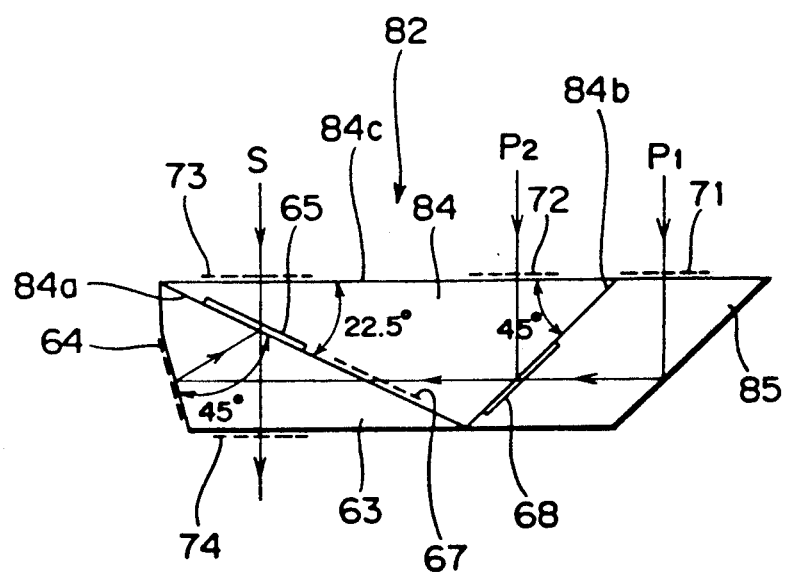
FIG. 11 is a diagrammatic representation of an optical coupler showing a fourth embodiment of the present invention.

Referring now to FIG. 11, there is shown, in a diagrammatic representation, construction of a prism unit according to a fourth embodiment of the present invention. Like parts or elements are denoted by like reference characters to those of the third embodiment shown in FIG. 8. A prism unit 82 in the present embodiment is constituted from a prism 63 having an included angle of 45 degrees, a triangular prism 84 and a parallelogram prism 85 adhered to each other in such a manner as shown in FIG. 11. The triangular prism 84 has an included angle of 22.5 degrees between a first inclined face 84a and a bottom face 84c and another included angle of 45 degrees between a second inclined face 84b and the bottom face 84c. An optical wavelength multiplexing film 65 and a filter film 67 are disposed between the prism 63 having an included angle of 45 degrees and the triangular prism 84 while a polarized beams coupling film 68 is disposed on an interface between the triangular prism 84 and the parallelogram prism 85. By employing the prism unit 82 of such construction, first and second pumping beams P₁ and P₂ and a signal beam S can be introduced in the same direction into the prism unit 82.

While no optical isolator is interposed between the focusing lens and the prism unit for wavelength multiplexing a signal beam and a pumping beam in the third and fourth embodiments described above, preferably an optical isolator is interposed between the focusing lens and the prism unit similarly as in the first embodiment shown in FIG. 3. Where an optical isolator is interposed, reflected returning light which tries to return from the Er doped optical fiber to the prism unit is stopped by the optical isolator, and accordingly, such troubles can be prevented that noises are produced in the optical fiber amplifier or that optical amplification is made unstable by resonance.

What is claimed is:

1. An optical coupler for coupling a first beam and a second beam having different wavelengths to each other, comprising:

a first prism including a pair of faces which define therebetween an included angle of 45 degrees, a first one of said faces having a total reflection film formed thereon, a second one of said faces having an optical wavelength multiplexing film formed thereon; and a second prism adhered to the second face of said first prism, said second prism having an apex angle sufficient to provide a wavelength multiplexing of the first beam and the second beam.

2. An optical coupler according to claim 1, wherein said second prism is a triangular prism having an apex angle of 22.5 degrees.

3. An optical coupler according to claim 1, wherein said second prism is a quadrangular prism having opposing apex angles of 22.5 degrees and 45 degrees.

4. An optical coupler according to claim 1, wherein the first beam is a signal beam, and the second beam is a pumping beam.

5. An optical coupler according to claim 4, further comprising polarized beams coupling means for coupling a first pumping beam and a second pumping beam having perpendicular polarization directions to each other.

6. An optical coupler according to claim 4, further comprising an Er doped fiber into which a wavelength multiplexed beam is introduced, and an optical isolator interposed between said Er doped fiber and said optical coupler.

7. An optical coupler for coupling a first beam and a second beam having different wavelengths to each other, comprising:

a first prism including a pair of faces which define therebetween an included angle of 45 degrees, a first one of said faces having a total reflection film formed thereon, a second one of said faces having an optical wavelength multiplexing film formed thereon;

a quadrangular prism having a first angle included between two faces thereof and being sufficient to allow a wavelength multiplexing of the first beam and the second beam and a second angle included between other faces thereof, said second angle being of 45 degrees and opposing to the first angle, said quadrangular prism being adhered to the second face of said first prism such that said first angle of said quadrangular prism is positioned adjacent the included angle of said first prism, said quadrangular prism having a polarized beams coupling film formed on a face thereof remote from the second face of said first prism; and a triangular prism adhered to the face of said quadrangular prism on which said polarized beams coupling film is formed.

8. An optical coupler according to claim 7, wherein the first beam is a signal beam, and the second beam is constituted from a first pumping beam and a second pumping beam having mutually perpendicular polarization directions.

9. An optical coupler according to claim 8, wherein a filter film which reflects a signal beam component but transmits the first and/or second pumping beams therethrough is provided on an interface of said quadrangular prism and said first prism through which the first and/or second pumping beams pass.

10. An optical coupler according to claim 9, wherein a filter film which reflects a signal beam component but transmits the first and/or second pumping beams therethrough is provided on each of end faces of said quadrangular prism and said triangular prism into which the first and/or second pumping beams are introduced.

11. An optical coupler for coupling a first beam and a second beam having different wavelengths to each other, comprising:

a first prism having a pair of faces which define therebetween an included angle of 45 degrees, a first one of said faces having a total reflection film formed thereon, a second one of said faces having an optical wavelength multiplexing film formed thereon;

a triangular prism having a first angle included between a first inclined face and a bottom face, thereof said first angle being sufficient to allow a wavelength multiplexing of the first beam and the second beam, and a second angle of 45 degrees included between a second inclined face and the bottom face of said triangular prism, said triangular prism being adhered to the second face of said first prism such that the first angle of the triangular prism is positioned adjacent the included angle of said first prism, said triangular prism having a polarized beams coupling film formed on the second face thereof; and a parallelogram prism adhered to the face of said triangular prism on which said polarized beams coupling film is formed.

12. An optical coupler according to claim 11, wherein the first beam is a signal beam, and the second beam is constituted from a first pumping beam and a second pumping beam having mutually perpendicular polarization directions.

13. An optical coupler according to claim 12, wherein a filter film which reflects a signal beam component but transmits the first and/or second pumping beams therethrough is provided on an interface of said triangular prism and said first prism through which the first and/or second pumping beams pass.

14. An optical coupler according to claim 13, wherein a filter film which reflects a signal beam component but transmits the first and/or second pumping beams therethrough is provided on each of end faces of said triangular prism and said parallelogram prism into which the first and/or second pumping beams are introduced.

* * * * *